(12) United States Patent
Fan

(10) Patent No.: US 12,553,568 B2
(45) Date of Patent: Feb. 17, 2026

(54) HOLDER WITH HARNESS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 18/628,573

(22) Filed: Apr. 5, 2024

(65) Prior Publication Data
US 2025/0067389 A1 Feb. 27, 2025

(51) Int. Cl.
F16M 13/02 (2006.01)
F16M 11/04 (2006.01)
F16M 11/10 (2006.01)

(52) U.S. Cl.
CPC ........ *F16M 13/022* (2013.01); *F16M 11/041* (2013.01); *F16M 11/10* (2013.01)

(58) Field of Classification Search
CPC ..... F16M 13/022; F16M 11/041; F16M 11/10
See application file for complete search history.

(56) References Cited

U.S. PATENT DOCUMENTS

| | | | | |
|---|---|---|---|---|
| 9,800,283 B2* | 10/2017 | Schmidt | ............. | A45C 13/1069 |
| 10,369,082 B2* | 8/2019 | Dedvukaj | ................ | A61J 9/06 |
| 11,476,882 B2* | 10/2022 | Fan | ....................... | H04B 1/3877 |
| 11,897,396 B2* | 2/2024 | Jankura | ................... | B62J 11/00 |
| 12,119,678 B2* | 10/2024 | Lu | ...................... | B65D 43/0202 |
| 2014/0312090 A1* | 10/2014 | Garza, Jr. | ............... | H04M 1/05 224/660 |
| 2016/0198836 A1* | 7/2016 | Fan | ........................... | A45F 5/00 224/271 |
| 2017/0314732 A1* | 11/2017 | Minn | ...................... | B60R 11/02 |
| 2018/0228280 A1* | 8/2018 | Li | .......................... | B65D 51/24 |
| 2019/0298047 A1* | 10/2019 | Vanettes | ................... | A45F 5/00 |
| 2022/0055798 A1* | 2/2022 | Morris | ...................... | B32B 7/12 |
| 2022/0228709 A1* | 7/2022 | Chao | ....................... | F16M 11/40 |
| 2023/0233006 A1* | 7/2023 | Alves | ................. | A47G 19/2227 248/213.2 |
| 2024/0148129 A1* | 5/2024 | Wang | ........................ | A45F 3/16 |

* cited by examiner

Primary Examiner — Monica E Millner
(74) Attorney, Agent, or Firm — John D. Tran; Rhema Law Group, P.C.

(57) ABSTRACT

A holder with a harness includes: a bearing member, a stopper, a supporting member, and the harness. The bearing member has a flat surface, a local area of the surface includes magnetic attraction area, and magnets are disposed in the bearing member to generate a magnetic force in the magnetic attraction area. The stopper is pivotally connected to the bearing member, and the stopper protrudes from the surface after being cocked up. The supporting member is pivotally connected to an edge of the bearing member and keeps an angle between the bearing member and the supporting member after being adjusted. The harness includes a flexible bent strap, and at least one end of the harness is coupled to the supporting member, such that the supporting member and the harness enclose to form a ring shape.

13 Claims, 9 Drawing Sheets

HOLDER WITH HARNESS

TECHNICAL FIELD

The present disclosure relates generally to the technical field of a holder with a harness, especially to a holder capable of holding an electronic device on a cylindrical object.

BACKGROUND

Mobile phones are electronic devices owned by most people nowadays to be used to not only answer calls at any time, but also watch videos. As the activity range of the users is getting wider and wider, it is desired to use the mobile phone at any time in a more convenient way and even use the mobile phone in a hands-free manner, and therefore various hands-free holders come out in the consumer market.

However, most of such holders are bulky and inconvenient to carry. Further, because most people would carry a water bottle when they do exercise outdoors, if the holder can be fixed on the water bottle in a simple way to bear the mobile phone, it can achieve the hands-free effect and meet the needs of the users. Certainly, the water bottle may be substituted by various cylindrical objects.

SUMMARY

One of the main purposes of the present disclosure is to provide a holder with a harness, which may be fixed on a cylindrical object by a structure of the harness. The cylindrical object may be a water bottle or other objects in a tubular shape. The holder may adjust a position of an electronic device, such as a mobile phone, disposed thereon and thus the user can use the mobile phone conveniently and in a hands-free manner.

To achieve the above purpose, the present disclosure provides a holder with a harness, comprising: a bearing member, a stopper, a supporting member, and the harness. The bearing member has a flat surface, a local area of the surface includes a magnetic attraction area, and magnets are disposed in the bearing member at the magnetic attraction area, so that the magnetic attraction area has a magnetic attracting force. The stopper is pivotally connected to the bearing member, and the stopper protrudes from the surface after being cocked up. The supporting member is pivotally connected to an edge of the bearing member and keeps an angle between the bearing member and the supporting member after being adjusted. The harness includes a flexible bent strap, and at least one end of the harness is coupled to the supporting member, such that the supporting member and the harness enclose to form a ring shape.

In one of the preferred embodiments, the bearing member includes a ring-shape structure, a center of the bearing member forms a through space, and the magnets are disposed in the ring-shape structure.

In one of the preferred embodiments, the ring-shape structure of the bearing member is formed with a groove in which the magnets are disposed, and a cover sheet is attached on the bearing member to close the groove, and an exposed flat area of the cover sheet is the surface.

In one of the preferred embodiments, most part of the stopper is in the space and do not protrude from the surface after the stopper is pivoted toward the bearing member.

In one of the preferred embodiments, the supporting member includes a bendable thin sheet with elasticity such that the supporting member recovers to an original state after an external force acting on the supporting member is removed, and the supporting member and the harness have a tightening effect by using an elastic force for recovering the supporting member to the original state when the bent supporting member and the harness enclose a circumference of a cylindrical object.

According to another aspect of the present disclosure, the present disclosure provides a holder with a harness, comprising: a bearing member, a supporting member, and the harness. The bearing member has a flat surface, a local area of the surface includes magnetic attraction area, and magnets are disposed in the bearing member at the magnetic attraction area, so that the magnetic attraction area has a magnetic attracting force. The supporting member is pivotally connected to an edge of the bearing member and keeps an angle between the bearing member and the supporting member after being adjusted. The harness includes a flexible bent strap, and at least one end of the harness is coupled to the supporting member, such that the supporting member and the harness enclose to form a ring shape.

Compared with the prior arts, the holder of the present holder with a harness is small in size and easy to carry, and can be quickly and conveniently fixed on a cylindrical object, thereby achieving the hands-free purpose of the electronic device and providing the user with excellent convenience.

DETAILED DESCRIPTION

Figure 1:
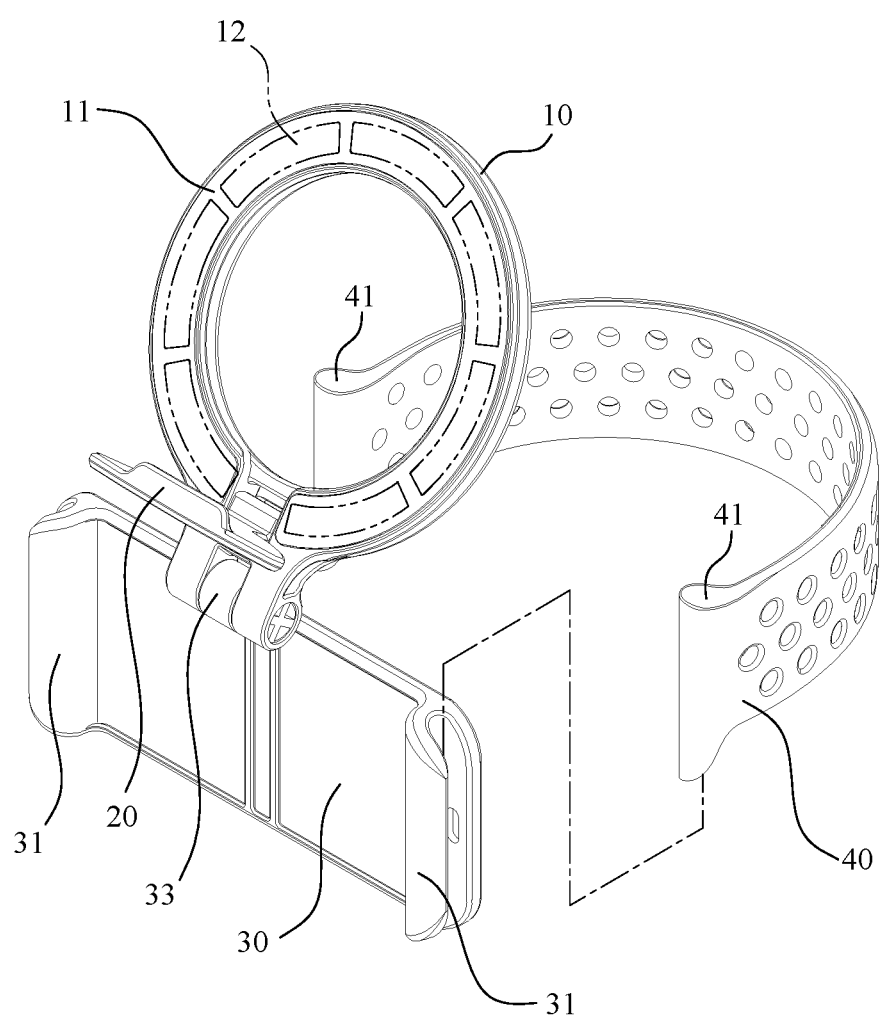
FIG. 1 is a perspective view of a holder with a harness according to the present invention.
Figure 2:
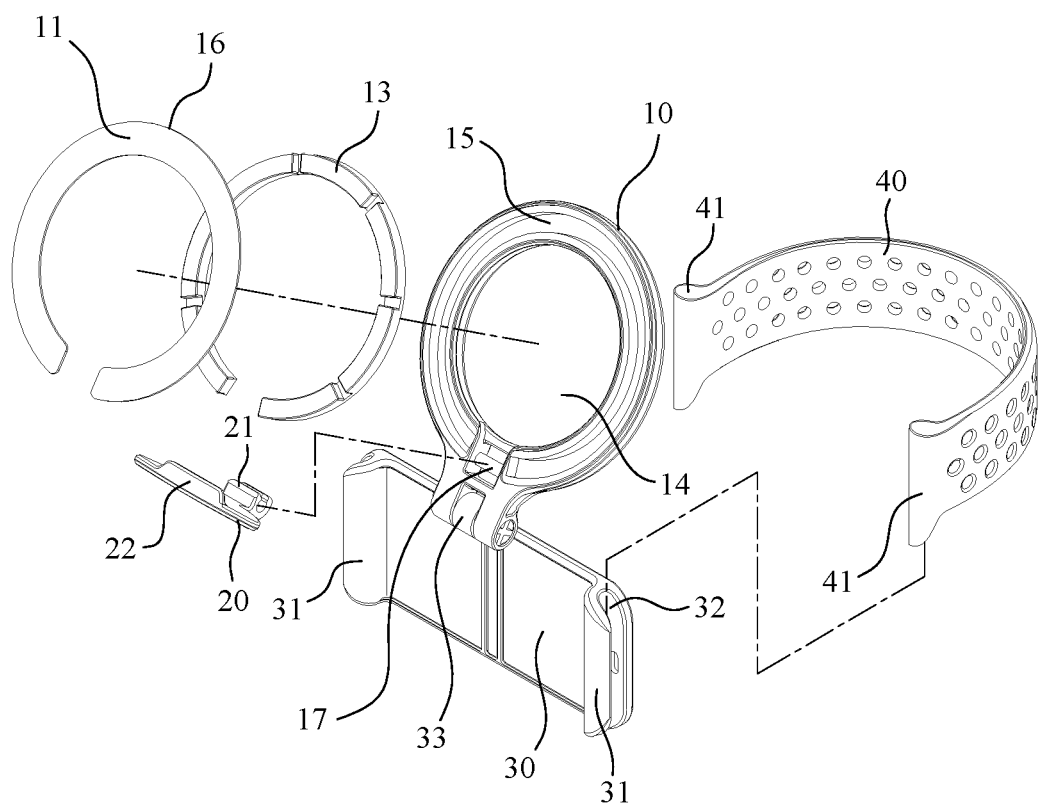
FIG. 2 is an exploded view of the holder of the present invention.
Figure 3:
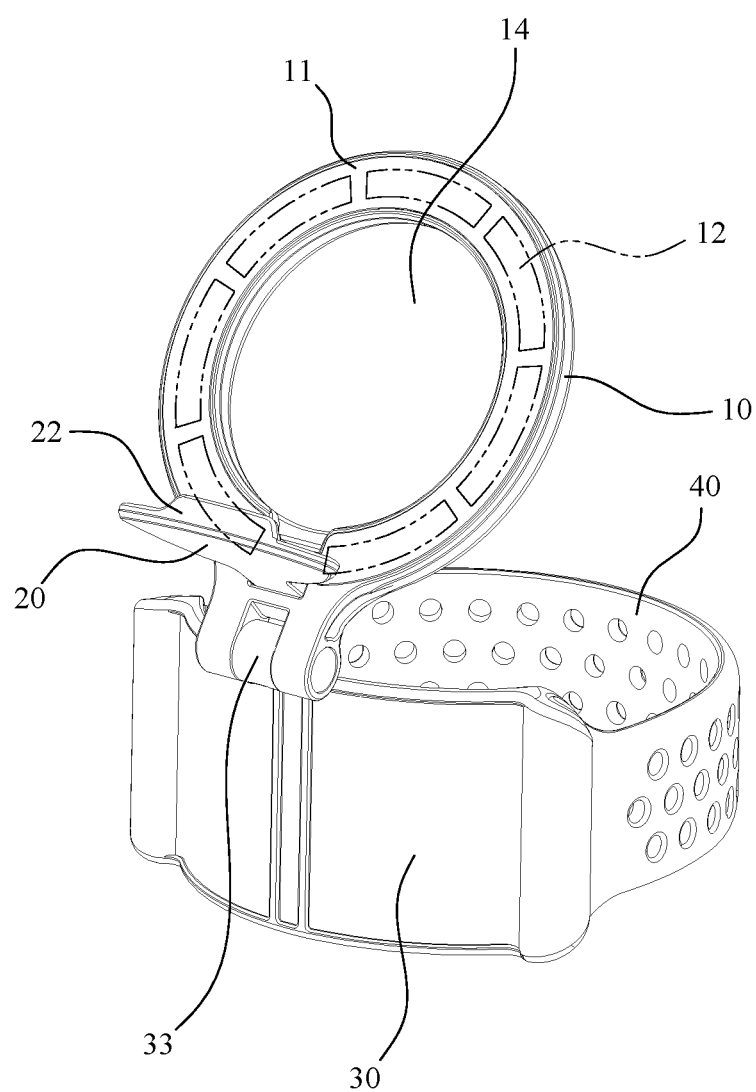
FIG. 3 is a perspective view showing that the holder of the present invention is in a use state and the supporting member is bent and deformed.

FIGS. 1-3 are a perspective view, an exploded view, and a view in a use state according to a holder with a harness of the present disclosure. The holder of the present disclosure comprises a bearing member 10, a stopper 20, a supporting member 30, and the harness 40. The bearing member 10 is mainly used for holding an electronic device thereon. The electronic device may be a mobile phone. The bearing member 10 may have a flat surface 11, a local area of the surface 11 may be a magnetic attraction area 12, and magnets 13 may be disposed in the bearing member 10 at the magnetic attraction area 12, such that the magnetic attraction area 12 has a magnetic attracting force. The magnetic attraction area 12 in these drawings may be represented by imaginary dashed lines. An end of the stopper 20 may be pivotally connected to the bearing member 10, the stopper 20 may protrude from the surface 11 after being cocked up, and the stopper 20 may be used to support an edge of the mobile phone to prevent the mobile phone from falling. The supporting member 30 may be pivotally connected to a side of the bearing member 10 adjacent thereto by a pivotally connecting structure 33, and the bearing member 10 may keep an angle from the supporting member 30 after being adjusted, so that the mobile phone may be disposed thereon in an inclined manner to allow the user to conveniently watch video played by the mobile phone. The harness 40 may be a flexible bent strap, and at least one end of the harness 40 may be coupled to the supporting member 30 as shown in FIG. 3. As such, a ring shape structure formed by the supporting member 30 and the harness 40 may be used to wrap or sleeve a circumference of a cylindrical object, thereby achieving the purpose of being fixed on the cylindrical object; therefore the mobile phone may be held by the bearing member 10 and the stopper 20 to let the user to use the mobile phone in a hands-free manner.

In the following, the elements of the present invention will be explained in detail as shown in FIG. 2.

The bearing member 10 achieves the purpose of attracting and holding the mobile phone mainly by the magnetic attracting force. In one embodiment of the present invention, the bearing member 10 may be a structure in a ring shape, the bearing member 10 may have a through space 14 in a center thereof, the ring-shape structure of the bearing member 10 may be formed with a groove 15, and magnets 13 may be disposed in the groove 15. In addition, the holder of the present invention may comprise a cover sheet 16, the cover sheet 16 may be a soft pad or a rubber pad, the cover sheet 16 may be attached onto the bearing member 10 to close the groove 15, an exposed flat area of the cover sheet 16 may be the surface 11 (as shown in FIG. 1), and thus a local area of the surface 11 may have the magnetic attraction area 12 that can generate a magnetic attracting force. Some mobile phones have a magnetic attracting force on a specific surface thereof, such as iPhone 12 and iPhone 13 product series, these kind of mobile phones can directly be attracted by the bearing member 10. On the other hand, other mobile phones without the magnetic attracting force may be attached with an iron sheet on a back side thereof. When the iron sheet is attracted by the bearing member 10, these kind of mobile phones also can be held on the bearing member 10.

Figure 4:
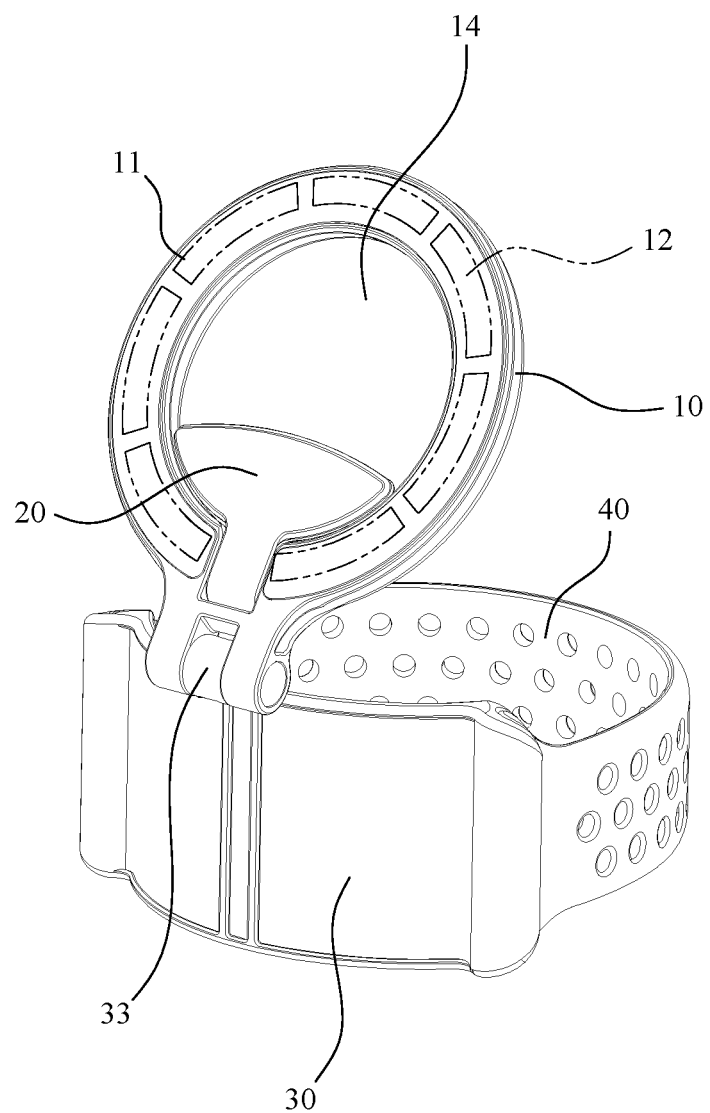
FIG. 4 is a perspective view showing that the holder of the present invention is in another use state.

Although the bearing member 10 can achieve the purpose of holding the mobile phone, the present invention additionally provides another security mechanism to prevent the mobile phone held on the bearing member 10 from falling. The bearing member 10 may additionally be pivotally connected to the stopper 20, and a pivotally connecting position of the stopper 20 may be close to the pivotally connecting structure 33 of the bearing member 10 and the supporting member 30. The stopper 20 may protrude from the surface 11 after being cocked up, a maximum open angle between the stopper 20 and the surface 11 may be 90°, and thus the stopper 20 may support an edge of the mobile phone to effectively prevent the mobile phone from slipping and falling. In addition, as shown in FIG. 4, in consideration of a good aesthetic appearance after being collapsed, when the stopper 20 is pivoted toward the bearing member 10 down to the lowest position, the most part of the stopper 20 may be in the space 14 and may not protrude from the surface 11, and a shape of the stopper 20 may be corresponding to a portion of a shape of the space 14, thereby presenting a good aesthetic appearance in a collapsed state. As shown in FIG. 2, in one embodiment of the present invention, in order for convenient assembling, the stopper 20 may have a connecting portion 21 at one end thereof, the connecting portion 21 may have a C-shaped spindle hole, the bearing member 10 may have a spindle 17 at a corresponding position thereto. When the connecting portion 21 is coupled to the spindle 17, the stopper 20 may pivot about the spindle 17 as a pivoting center. In addition, the stopper 20 may have a protruding portion 22 at another end thereof far away from the connecting portion 21. The protruding portion 22 functions as preventing the mobile phone from slipping and falling.

A side of the supporting member 30 adjacent to the bearing member 10 may be coupled to the bearing member 10 by the pivotally connecting structure 33, an angle between the supporting member 30 and the bearing member 10 may be adjustably controlled, and an adjustable maximum angle may be up to 270°. In one embodiment of the present invention, the pivotally connecting structure 33 of the supporting member 30 and the bearing member 10 may be tight fitting, and thus the bearing member 10 may keep the angle from the supporting member 30 after being adjusted.

In the present invention, the supporting member 30 and the harness 40 may be secured and fixed on a target object. The supporting member 30 may include a bendable thin sheet, the thin sheet has elasticity, and thus the supporting member 30 may recover to an original state when an external force acting on the supporting member 30 is removed. When the bent and deformed supporting member 30 and the harness 40 enclose a circumference of the cylindrical object, an elastic force of the supporting member 30 for recovering the supporting member 30 to the original state may make the supporting member 30 and the harness 40 have an effect of tightening. In FIGS. 3 and 4, the supporting member 30 is assumed to be in a deformed state under an action of an external force, and the external force is not yet removed. The harness 40 may include a flexible bent strap for wrapping or sleeving the circumference of the cylindrical object to achieve the purpose of tightening and fixing. The harness 40 may be embodied by various means, e.g., a two-piece dual-direction folded strap, but not limited thereto, i.e., the strap may include two pieces connected to two ends of the supporting member 30 respectively and two ends of the strap may be buckled to each other. Hereinafter, the present invention is explained with only one kind of harness, however it is not limited thereto. In one embodiment of the present invention, two ends of the supporting member 30 far away from the pivotally connecting structure 33 in a transverse direction may have a clamping portion 31 respectively, a cross section of the clamping portion 31 may have a C shape that forms a coupling groove 32, and a transverse size at the deepest position in the coupling groove 32 is larger than a size at an opening thereof. Two ends of the harness 40 may have a coupling portion 41 respectively, a shape of the coupling portion 41 is corresponding to that of the coupling groove 32, and in assembling, the coupling portions 41 of the harness 40 may be inserted into the coupling grooves 32 along a specific direction. When the coupling portions 41 are inserted into and along a central line of the coupling grooves 32, e.g., from top to bottom or from bottom to top in the drawing, the harness 40 and the supporting member 30 may enclose to form a ring shape such that the harness 40 may not fall off even if it is pulled in a direction vertical to and far away from the supporting member 30. In addition, the harness 40 may include an elastic strap capable of contracting and elongating, and it can spontaneously recover to an original state as an external force acting thereon is removed.

Next, the use method of the present invention will be explained as follows.

Figure 5:
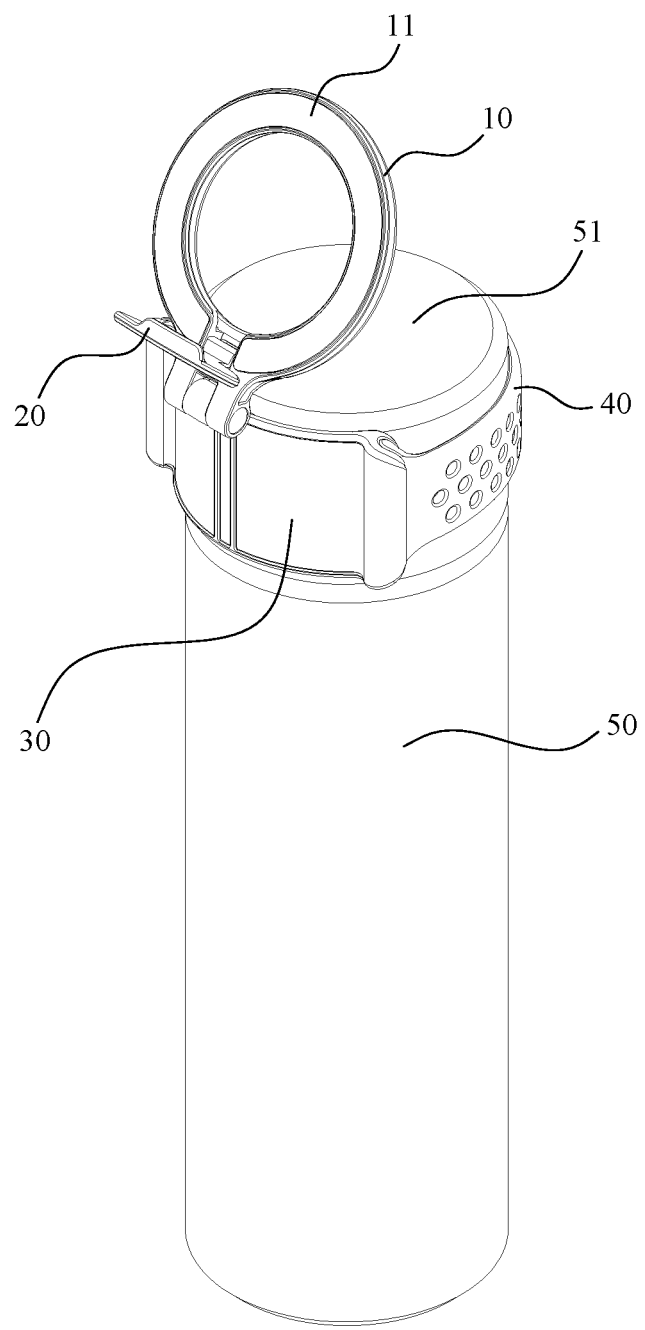
FIG. 5 is a perspective view showing that the holder of the present invention is in a practical use state.
Figure 6:
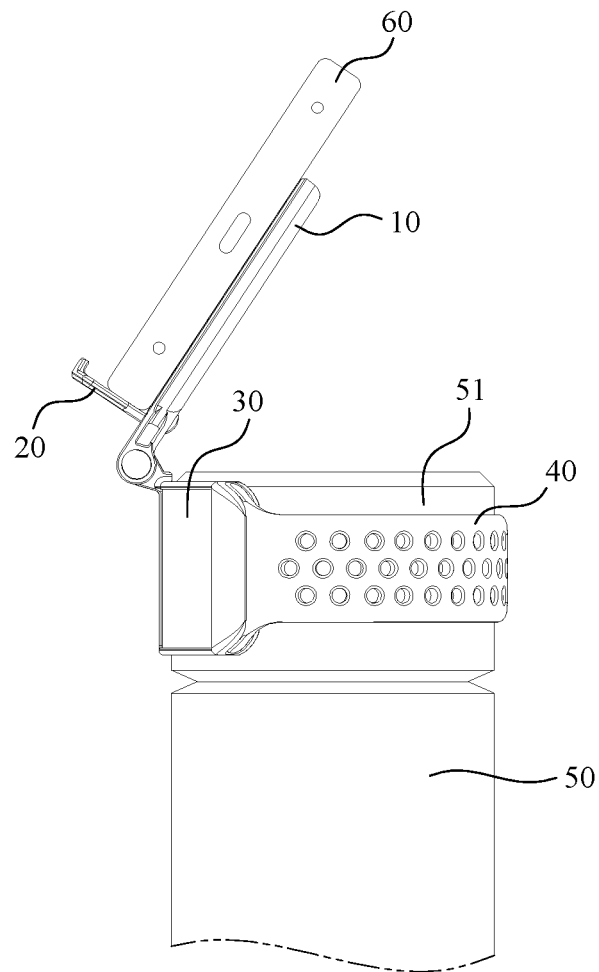
FIG. 6 is a side view showing that a mobile phone is disposed on the holder of the present invention.

As shown in FIG. 5, in one embodiment of the present invention, the cylindrical object on which the harness is fixed may be a water bottle 50. The ring shape structure formed by the supporting member 30 and the harness 40 may sleeve on a top portion of the water bottle 50, which is a bottle cap 51, meanwhile the supporting member 30 and the harness 40 may achieve the purpose of tightening by a deformed state of the supporting member 30. The bearing member 10 may be cocked up to form an inclined state, and the stopper 20 may also be cocked up to protrude from the surface 11. As shown in FIG. 6, a mobile phone 60 may be transversely disposed on the surface 11, a purpose of attracting and holding the mobile phone 60 may be achieved by the magnetic attracting force of the magnetic attraction area 12, and the stopper 20 may support an edge of the mobile phone 60 to further prevent the mobile phone 60 from slipping and falling.

Figure 7:
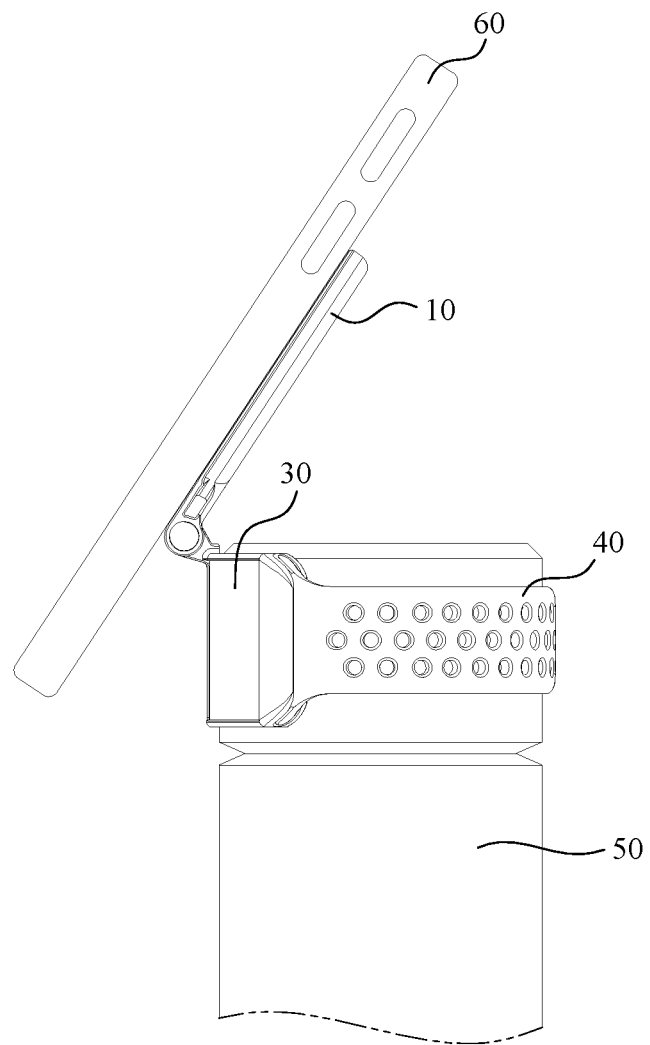
FIG. 7 is a side view showing that a mobile phone is disposed on the holder of the present invention in another state.

As shown in FIG. 4 and FIG. 7, when the stopper 20 is pushed into the space 14, a back surface of the mobile phone 60 may be attracted in an upright manner by the magnetic attraction area 12, and thus the mobile phone 60 may be held on the water bottle 60 in a different holding way.

Figure 8:
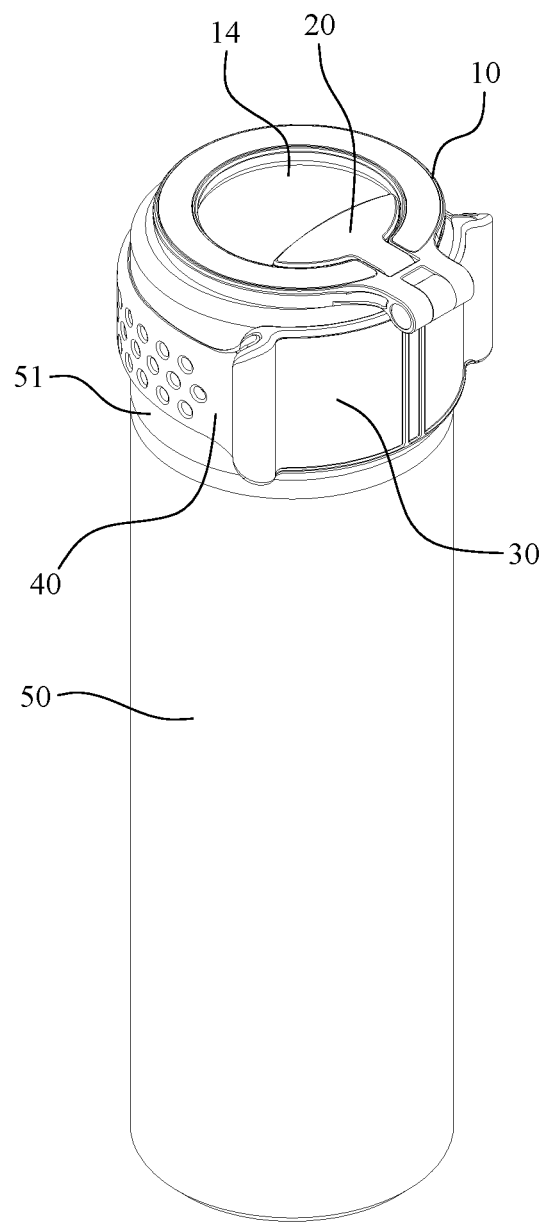
FIG. 8 is a perspective view showing that the holder of the present invention is in a collapsed state.

As shown in FIG. 8, as the holder is not in use, the bearing member 10 may be turned down to attach on a top surface of the bottle cap 51, and the stopper 20 may also be pushed into the space 14. The holder may be considered as a decoration that shows a good aesthetic appearance. In addition, as the bottle cap 51 is taken off from the water bottle 50, the holder may not be loosened. Therefore, the holder of the present invention is a very practical and convenient design.

In addition, the bearing member 10 of the holder of the present invention uses the magnetic attracting force to attract the mobile phone 60. Also, the present invention can provide a more compact structure without the stopper 20, thereby providing a simpler and lower-cost holder.

Figure 9:
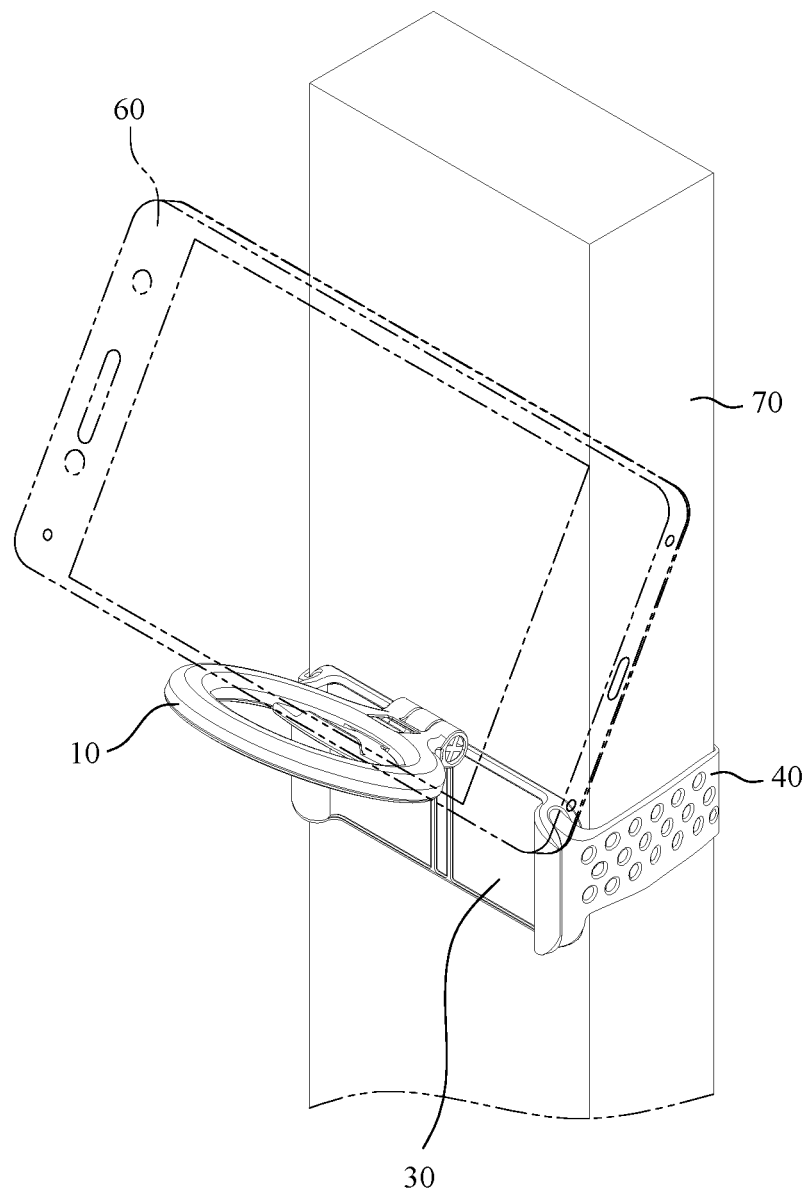
FIG. 9 is a view showing another use state of the holder of the present invention.

FIG. 9 is a view showing another use state of the holder of the present invention. In one embodiment of the present invention, the cylindrical object is substituted by a rectangular prism 70. A closed shape structure formed by the supporting member 30 and the harness 40 encloses a circumference of the rectangular prism 70. The bearing member 10 is adjusted to be a desired inclination angle, and thus a bottom edge of the mobile phone 60 may be placed on the bearing member 10 and a top edge of the mobile phone 60 may be leaned against the rectangular prism 70. It shows another hands-free use state of the mobile phone. In addition, according to one embodiment of the present invention, the cylindrical object may be substituted by a column object with any shape.

The above embodiments are intended to exemplarily explain the effects of the present invention, rather than limit it. A person of ordinary skill in the art can make modification and variation to the present invention without violating the spirit and category thereof. In addition, the numbers of the elements in the embodiments are exemplary and are not intended to limit the present invention. As such, the scopes of the claims of the present application are defined as the claims recited below.

What is claimed is:

1. A holder with a harness, comprising:
    a bearing member having a flat surface, wherein the flat surface includes a magnetic attraction area from a magnet disposed in the bearing member, the bearing member is a ring-shape structure, a center of the bearing member forms a through space, and the magnet is disposed in the ring-shape structure;
    a supporting member disposed with a pivotally connecting structure at a side thereof, the pivotally connecting structure connected to the bearing member, and the pivotally connecting structure keeps an angle between the bearing member and the supporting member after being adjusted;
    the harness including a flexible strap with an end coupled to the supporting member, such that the supporting member and the harness enclose to form a ring shape; and
    a part of a stopper is in the through space and the stopper does not protrude from the flat surface after the stopper is pivoted toward the bearing member.

2. The holder according to claim 1, wherein the ring-shape structure of the bearing member is formed with a groove in which the magnet is disposed, and a cover sheet is attached on the bearing member to close the groove, and an exposed flat area of the cover sheet is the flat surface.

3. The holder according to claim 1, wherein the supporting member includes a bendable thin sheet with elasticity such that the supporting member recovers to an original state after an external force acting on the supporting member is removed, and the supporting member and the harness have a tightening effect by using an elastic force for recovering the supporting member to the original state when the supporting member and the harness enclose an object.

4. The holder according to claim 1, wherein:
    the supporting member includes a coupling groove; and
    the harness includes a coupling portion configured to insert into the coupling groove.

5. A holder with a harness, comprising:
    a bearing member having a flat surface, the flat surface includes a magnetic attraction area from a magnet disposed in the bearing member, the bearing member is a ring-shape structure, a center of the bearing member forms a through space, and the magnet is disposed in the ring-shape structure;
    a stopper pivotally connected to the bearing member, and protruding from the flat surface based on the bearing member being in a cocked up angle, and a part of the stopper is in the through space and the stopper does not protrude from the flat surface after the stopper is pivoted toward the bearing member;
    a supporting member disposed with a pivotally connecting structure at a side thereof, the pivotally connecting structure connected to the bearing member, and the pivotally connecting structure keeps the cocked up angle between the bearing member and the supporting member after being adjusted; and
    the harness including a flexible strap with an end coupled to the supporting member, such that the supporting member and the harness enclose to form a ring shape.

6. The holder according to claim 5, wherein the ring-shape structure of the bearing member is formed with a groove in which the magnet is disposed, and a cover sheet is attached on the bearing member to close the groove, and an exposed flat area of the cover sheet is the flat surface.

7. The holder according to claim 5, wherein the supporting member includes a bendable thin sheet with elasticity such that the supporting member recovers to an original state after an external force acting on the supporting member is removed, and the supporting member and the harness have a tightening effect by using an elastic force for recovering the supporting member to the original state when the supporting member and the harness enclose an object.

8. A method of manufacturing a holder with a harness, comprising:
- forming a bearing member having a flat surface, wherein the flat surface includes a magnetic attraction area from a magnet disposed in the bearing member wherein forming the bearing member includes forming a ring-shape structure with a center of the bearing member forming a through space, and depositing the magnet in the ring-shape structure;
- pivotally connecting a stopper to the bearing member, and the stopper protruding from the flat surface based on the bearing member being in a cocked up angle, wherein pivotally connecting the stopper includes connecting a part of the stopper in the through space such that the stopper does not protrude from the flat surface after the stopper is pivoted toward the bearing member;
- connecting a supporting member disposed with a pivotally connecting structure at a side thereof, the pivotally connecting structure connected to the bearing member, and the pivotally connecting structure keeps an angle between the bearing member and the supporting member after being adjusted, and the pivotally connecting structure keeping the cocked up angle between the bearing member and the supporting member after being adjusted; and
- coupling the harness with an end of the harness coupled to the supporting member, such that the supporting member and the harness enclose to form a ring shape, the harness including a flexible strap.

9. The method according to claim 8, wherein forming the ring-shape structure of the bearing member includes:
- forming a groove in which the magnet is disposed; and
- attaching a cover sheet on the bearing member to close the groove, and an exposed flat area of the cover sheet is the flat surface.

10. The method according to claim 8, wherein connecting the supporting member includes connecting a bendable thin sheet with elasticity such that the supporting member recovers to an original state after an external force acting on the supporting member is removed, and the supporting member and the harness have a tightening effect by using an elastic force for recovering the supporting member to the original state when the supporting member and the harness enclose an object.

11. The method according to claim 8, wherein:
- connecting the supporting member includes forming a coupling groove; and
- coupling the harness includes inserting a coupling portion into the coupling groove.

12. The method according to claim 8, wherein forming the ring-shape structure of the bearing member includes:
- forming a groove in which the magnet is disposed; and
- attaching a cover sheet on the bearing member to close the groove, and an exposed flat area of the cover sheet is the flat surface.

13. The method according to claim 8, wherein connecting the supporting member includes connecting a bendable thin sheet with elasticity such that the supporting member recovers to an original state after an external force acting on the supporting member is removed, and the supporting member and the harness have a tightening effect by using an elastic force for recovering the supporting member to the original state when the supporting member and the harness enclose an object.

* * * * *